United States Patent [19]

Vierling et al.

[11] 3,920,935

[45] Nov. 18, 1975

[54] METHOD FOR MEASURING THE FREQUENCY-DEPENDENT ATTENUATION OF A TELECOMMUNICATIONS LINE, ESPECIALLY A TWO-WIRE LINE

[75] Inventors: Oskar Vierling, Ebermannstadt; Hansjürgen Wieland, Darmstadt, both of Germany

[73] Assignee: Oskar Vierling, Ebermannstadt, Germany

[22] Filed: Sept. 28, 1973

[21] Appl. No.: 401,693

Related U.S. Application Data

[63] Continuation of Ser. No. 207,858, Dec. 14, 1971, abandoned.

[30] Foreign Application Priority Data

Dec. 21, 1970 Germany ........................... 2062812

[52] U.S. Cl. ........................................ 179/175.3 R

[51] Int. Cl.$^2$ ........................................ H04B 3/46

[58] Field of Search ........... 179/175.3 R, 175.31 R; 324/52

[56] References Cited

UNITED STATES PATENTS

| | | | |
|---|---|---|---|
| 1,968,164 | 7/1934 | Nyquist | 179/175.3 R |
| 2,666,099 | 1/1954 | Bonner | 179/175.3 R |
| 2,721,235 | 10/1955 | McKim et al. | 179/175.3 R |
| 3,431,369 | 3/1969 | McLaughlin | 179/175.3 R |
| 3,436,496 | 4/1969 | Ingle | 179/175.3 R |

*Primary Examiner*—Kathleen H. Claffy
*Assistant Examiner*—Douglas W. Olms
*Attorney, Agent, or Firm*—Edwin E. Greigg

[57] ABSTRACT

A method for measuring the frequency-dependent attenuation of a telecommunications line, particularly a two-wire line, in both traffic directions, from one line end. Measurement voltages having diverse frequencies are transmitted from the measurement end and converted at an opposite station into voltages which in each case have a different frequency but whose amplitude, frequency, phase or frequency spectrum correspond to the amplitude of the particular measurement voltage received at the opposite station and which are transmitted via the line to be measured to the measurement station where they are separated from the transmission voltages by frequency-dependent members.

14 Claims, 3 Drawing Figures

METHOD FOR MEASURING THE FREQUENCY-DEPENDENT ATTENUATION OF A TELECOMMUNICATIONS LINE, ESPECIALLY A TWO-WIRE LINE

This is a continuation of application Ser. No. 207,858, filed Dec. 14, 1971, now abandoned.

BACKGROUND OF THE INVENTION

It is known that the attenuation of telecommunications lines can be measured in both traffic directions, from one line end. The frequency-dependent attenuation of the line is determined first in the direction toward the measurement station. The line is connected, by means of the corresponding switching of remote-controlled devices, which are provided in the opposite station of the line end, via the line to be measured, first to a signal generator having a predetermined frequency $f_m$ and then to a switchable fixed-frequency or wobble generator. Then, the frequency-dependent attenuation of the line, in the direction away from the measurement station, is determined by measuring the sum of the attenuation of the lines, in both directions, related to the attenuation at frequency $f_m$. The influence of frequency-dependent attenuation of the line, in the direction toward the measurement station, is eliminated by converting the measurement voltages, which are received in the opposite station at all frequencies, to a measurement voltage with frequency $f_m$. Such an arrangement is shown in German Patent No. 1,190,051. This method, which can be applied primarily to four-wire lines, can also measure two-wire lines if one connects two such two-wire lines first operating one of them in the direction from the measurement station to the opposite station and the other one in the direction from the opposite station to the measurement station, in order then to switch the traffic directions.

It should be apparent the connection and the switching of, in each case, two lines result in complications and increased expenditures in terms of communications technology. The object of the invention therefore is to provide a way for measuring the attenuation of a two-wire line, by itself, in both traffic directions, from one line end, without at the same time having to connect additional lines in.

BRIEF DESCRIPTION OF THE INVENTION

This object is achieved in accordance with the invention in that the frequency-dependent attenuation of the line, in the direction from the measurement station to the opposite station, is determined through measurement voltages which have diverse frequencies and which are transmitted from the measurement station to the opposite direction, and converted in the opposite station into voltages with, in each case, a different frequency whose amplitude, frequency, phase or frequency spectrum corresponds to the amplitude of the particular measurement voltage received at the opposite station and which are transmitted via the line to be measured to the measurement station where they are separated from the transmission voltages by frequency-dependent members.

The measurement values, that is, the measurement voltages which are received in the opposite station and which in each case are attenuated as a function of the frequency, are retransmitted to the measurement station with a frequency other than the measurement frequency (transmission frequency). It is therefore possible to transmit the measurement voltages and to receive the measurement values simultaneously via one line. The frequency for retransmission could in each case be obtained from the transmission frequency by means of a frequency shift of a constant or relative amount. Particularly favorable conditions in terms of instruments, however, are also obtained according to a further embodiment of the invention wherein the frequency band of the measurement voltages is subdivided into at least two ranges. The retransmission of the measurement values, from the opposite station to the measurement station, takes place with one or more frequencies of the other range during the transmission of measurement voltages of one frequency range.

In a further embodiment of the invention, for the retransmission of the measurement values from the opposite station to the measurement station, the measurement voltages received in the opposite station, at all frequencies of one range, are converted, while retaining their amplitude, into voltages with a frequency in the other range.

Instead of using amplitude modulation, the measurement values, however, can be retransmitted also through frequency variation. A corresponding version of the invention is characterized by the fact that, in order to retransmit the measurement values from the opposite station to the measurement station, the measurement voltages, which are received in the opposite station at all frequencies of one range, are converted into the frequencies of the other range which correspond to the amplitudes of the reception voltages.

The method involved in the invention is not confined to the transmission of analog values, but can also be carried out with digital values. To this end, in accordance with another embodiment of the invention, for retransmitting the measurement values from the opposite station to the measurement station, the measurement voltages, received in the opposite station at all frequencies of one range, are converted into pulses which correspond to the amplitudes of the reception voltages and which are modulated with one or more frequencies of the other range, whereby the modulation spectrum in each case is limited to the last-named range.

SUMMARY OF THE INVENTION

The invention offers the following advantages: regardless of whether it is equipped with terminating sets (matched transformers) on both sides and regardless of the properties of the terminating sets (hybrid terminations), every two-wire line can be measured for itself, whereby various kinds of retransmission of the measurement values to the measurement station can be employed. The retransmission of the measurement values is accomplished simultaneously with the transmission of the measurement voltages so that the measurement frequency, measurement amplitude, and measurement duration can be determined entirely free from the measurement station.

BRIEF DESCRIPTION OF THE DRAWINGS

The invention is described below in greater detail with the help of an example illustrated by the drawings wherein.

DESCRIPTION OF THE PREFERRED EMBODIMENTS

Figure 1:
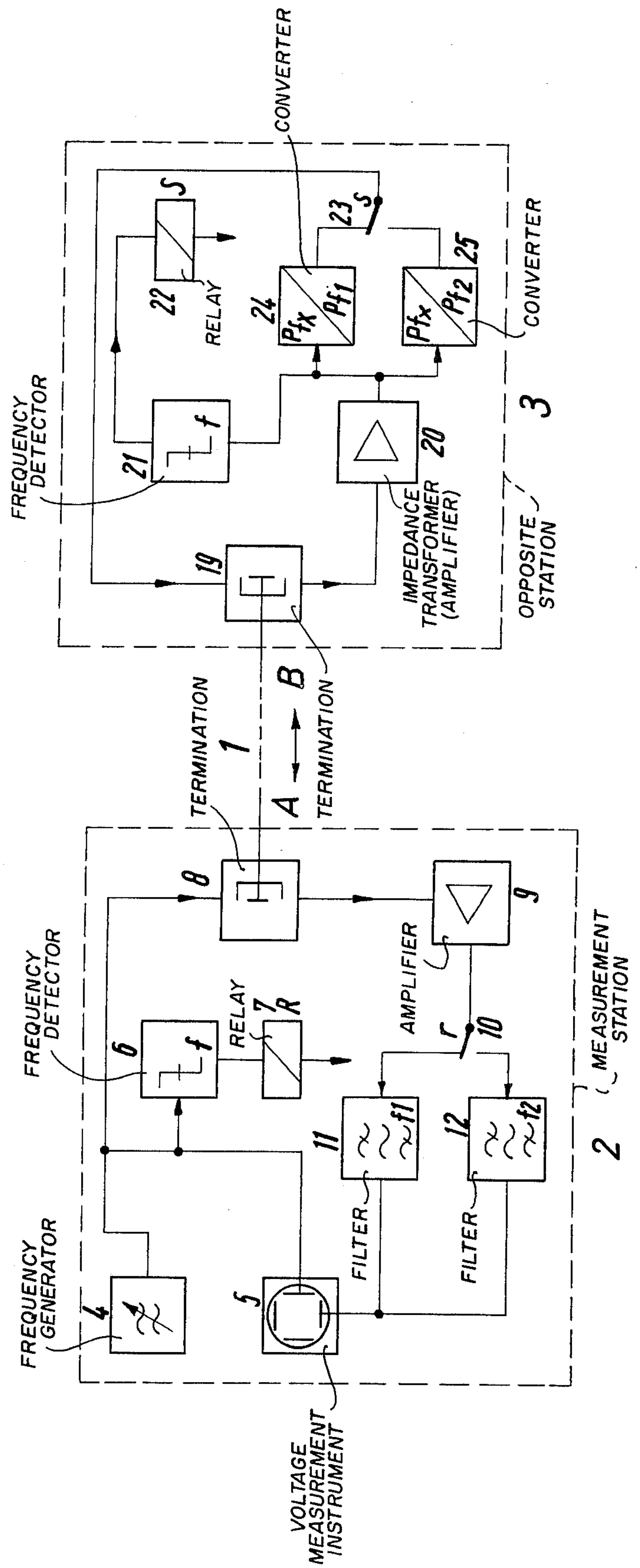
FIG. 1 shows in block diagram form a circuit for the retransmission of the measurement values from the opposite station to the measurement station by means of amplitude modulation.
Figure 2:
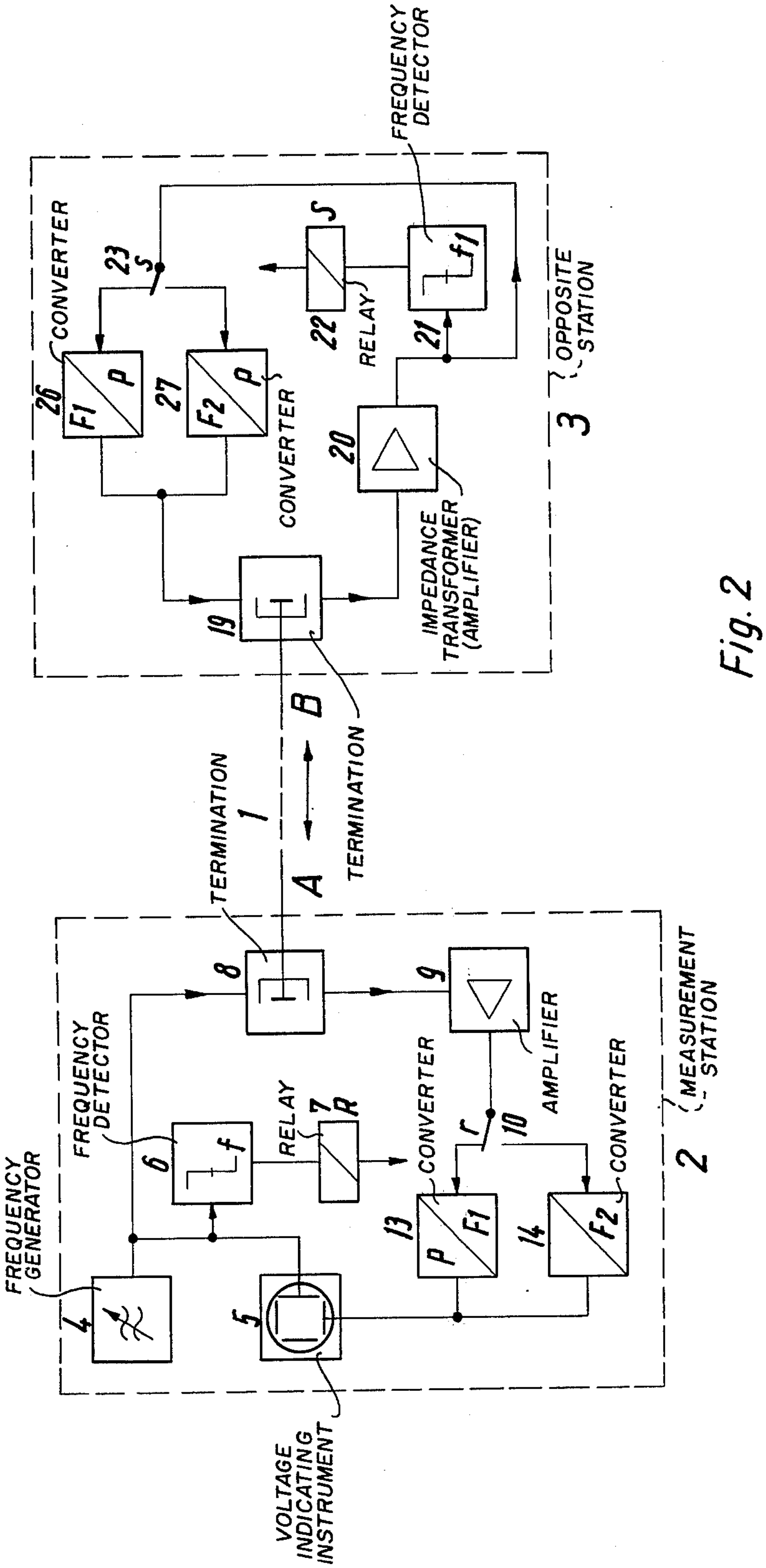
FIG. 2 shows in block diagram form a circuit for the retransmission of measurement values through frequency modulation.
Figure 3:
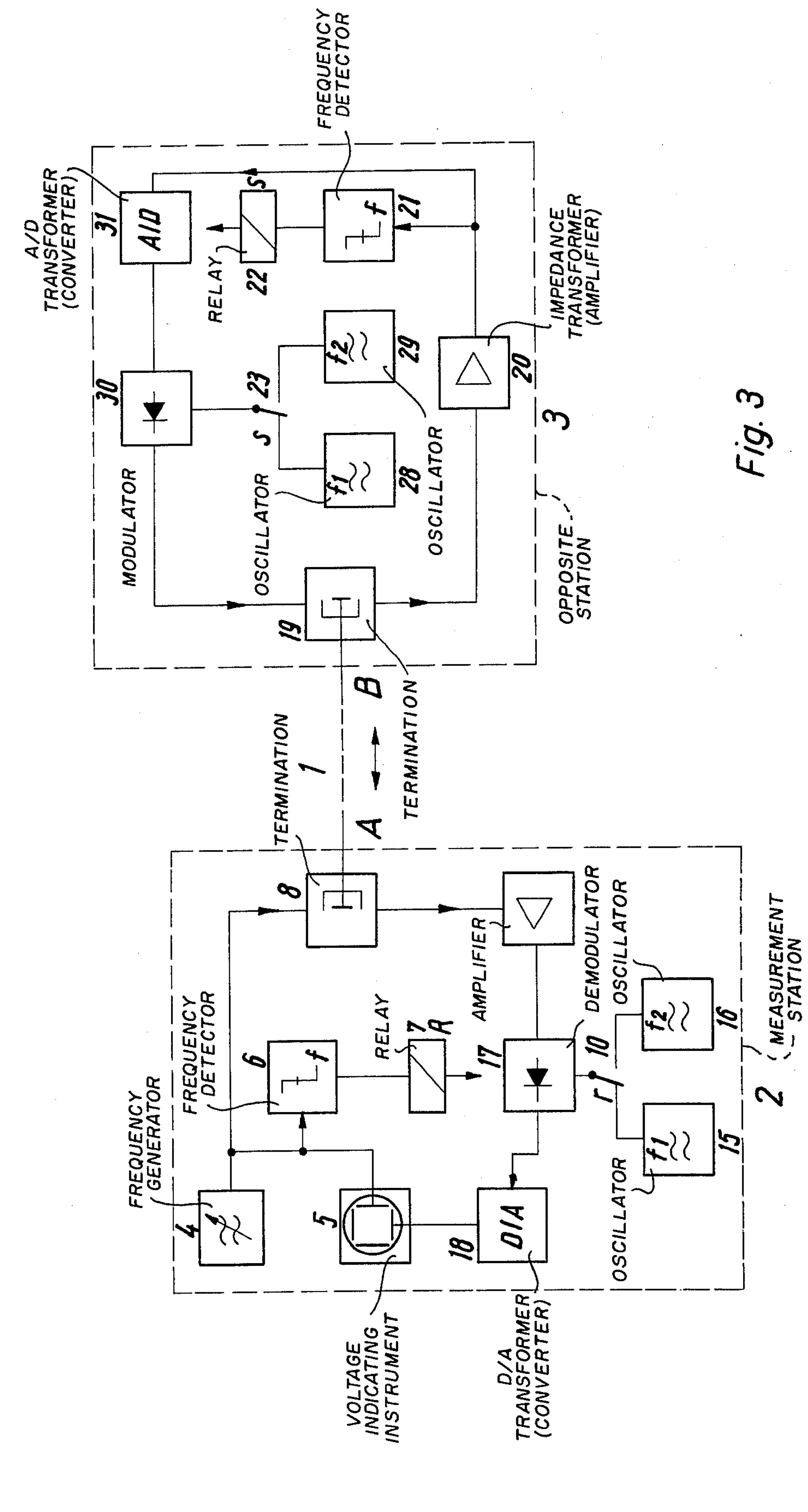
FIG. 3 shows in block diagram form a digital retransmission method.

FIGS. 1–3 show the line to be measured 1 which connects an exchange equipped with measurement station 2, for example, a main exchange, with an unoccupied opposite station 3, for example, a central exchange or terminal exchange. In all examples, it is assumed that the measurement of the transmission direction B–A is known. It can, for example, be executed by means of remote-controlled fixed-frequency or wobble generators connected to the line end B by means of control from measurement station 2.

Line 1 can, at opposite ends, be connected to terminations 8 and 19 which separate the incoming and outgoing directions. The terminations generally belong to line 1 and are to be measured together with it. The invention, however, as will be explained later on, is not tied to the presence of hybrid terminations (terminating sets).

Measurement station 2 in each case contains one fixed-frequency or wobble generator 4 and a spectrally resolving alternating voltage measurement instrument 5, for example, a level screen. Measurement station 2 also includes a switching member 10 which is activated as a function of the transmission or reception frequency. In FIGS. 1–3, switching member 10 is illustrated as a contact *r* of a R-relay 7. The relay is controlled by a frequency detector 6 connected to generator 4. The contact *r* can also be embodied in a simple manner by means of a cam contact in generator 4. Furthermore, it is generally possible to activate the switching member 10 by means of the reception frequency, for which purpose the frequency detector 6 is arranged in the lower branch of measurement station 2, for example, at the output of an amplifier 9 which is used here as impedance transformer or converter.

The opposite station 3 contains, in each case, an impedance transformer 20, which adapts the input resistance of the next following circuit to the termination 19, and a frequency detector 21 which is controlled by the reception frequencies. Detector 21 activates a switching member 23, via a S-relay 22.

In FIG. 1 the attenuation of line 1 is determined first in direction B–A in the known manner. To this end, a fixed-frequency or wobble generator, not shown, is connected at line end B, remote-controlled from measurement point 2. In order to measure the direction A–B, generator 4, which can likewise be a fixed-frequency or wobble generator, is connected to line end A via termination 8. The measurement voltages travel via line 1 to line end B and arrive there, dependent on the attenuation of line 1, at the particular measurement frequency $f_x$, in a more or less attenuated condition. The voltages are supplied to impedance transformer 20 via termination 19 and then conducted toward two converters 24 and 25. The conveter 24 converts the reception voltages of all frequencies $f_x$, retaining their amplitude, into voltages having a fixed frequency $f_1$. Converter 25, likewise retaining the amplitudes, of the voltages, converts them into voltages iwth another fixed frequency $f_2$; $f_1$, may be, for example, 1,600 cps and $f_2$, may be, for example, 800 cps, if the range of measurement frequencies is between 0.2 and 3.5 Kc, which is usual. Thus, the converters 24 and 25 each effect an amplitude modulation of respective single frequency signals, the amplitude variations corresponding to the amplitude of the signal being received by the impedance transformer 20 at any given time.

Frequency detector 21, at the output of impedance transformer 20, determines whether the particular reception frequency $f_x$ is above or below a boundary value $f$ of, for example, 1,200 cps. If $f_x$ is smaller than the boundary frequency $f$, the S-relay 22 remains unexcited and the switching member 23 assumes the position shown. When measuring in the lower frequency range from 0.2 to 1.2 Kc, the output of the converter 24 is thus connected with the outgoing side of termination 19 and the output voltage of converter 24, which in each case has the same amplitude as the reception voltage, but which has a constant frequency $f_1$ of 1,600 cps, is sent back to the measurement station 2 via line 1.

The measurement values received at line end A with 1,600 cps, are supplied via termination 8 to an impedance converter 9 and switching member 10 to a filter 11. Filter 11 only allows the passage of frequency $f_1$, corresponding to frequencies above 1,200 cps, and passes them on to the level screen 5. The voltage of generator 4, which, when termination 8 is not present or when termination 8 has a finite transition attenuation, could arrive (at least some of its portions) in the lower circuit. This voltage is reliably kept away from the level screen 5 by means of filter 11 and thus cannot falsify the measurement result.

The voltages, which are received at line end A, are of course attenuated by the amount of the attenuation of line 1 in direction B–A at 1,600 cps, compared to the reception voltages at line end B, but this amount is constant because the transmission frequency $f_1$ is constant and, furthermore, it is known from the preceding measurement in direction B–A. It can be eliminated from the indication of the level screen 5 by means of the corresponding adjustment of the adjusting members at level screen 5 or by means of an additional amplifier which is adjustable or which is coupled with an adjustable attenuation member. One such amplifier, each, would best be arranged after filter 11 and filter 12.

If the measurement frequency $f_x$ exceeds the boundary frequency $f$ of 1,200 cps, then the R-relay 7 in measurement station 2 is excited via the frequency detector 6, and the S-relay 22 in opposite station 3 is excited via frequency detector 21. The reception voltages in the opposite station 3 are now retransmitted to the measurement station 2, retaining their amplitude, with a frequency $f_2$ amounting to 800 cps, because switching member 23 now connects converter 25 with the outgoing branch of termination 19. In measurement station 2, the measurement values received reach the level screen 5 bia switching member 10, which is now in a different position, and a filter 12, which allows only the frequency $f_2$, corresponding to frequencies below 1,200 cps, to pass through. The voltage of generator 4, which is above 1,200 cps, again cannot influence the indication. The attenuation of line 1 in direction B–A at a frequency of $f_2$ amounting to 800 cps is known from the prior measurement in direction B–A and can be eliminated as described in connection with $f_1$.

If generator 4 is a wobble generator, there is obtained on the level screen a closed curve line which reproduces the attenuation A–B in the measurement frequency range from 0.2 to 3.5 Kc. When filters 11 and 12 and switching members 10 and 23 are suitably designed, one cannot see that the retransmission of the measurement values, from the opposite station 3 to the measurement station 2, takes place in the lower frequency range with 1,600 cps and in the upper frequency range with 800 cps. Switching member 10 in this case can be a contact controlled directly by generator 4, for example, a cam contact. If generator 4 is a fixed-frequency generator which can be adjusted to separate discreet frequencies, then the level screen 5 reproduces the attenuation A–B, at the measurement frequencies, in a point-shaped manner. Instead of a level screen there can of course be used any other spectrally resolving alternating voltage measurement instruments. Likewise, the measurement values received at the output of filters 11 and 12 can be stored and/or can be supplied to an evaluation circuit which will test them for compliance with the previously established lower and upper limits.

FIG. 2 shows a derived method, in which the attenuation B–A does not play any role in the measurement of the attenuation A–B, so that the sequence of the two measurements is arbitrary. To measure the attenuation of line 1 in direction A–B, generator 4 is connected to the line end A via termination 8. The voltages, which are received in the opposite station at line end B, are supplied, depending upon the position of the switching member 23, either to a converter 26 or a converter 27. Converter 26 converts the reception voltages, according to the frequency variation method, into the frequencies which correspond to the particular amplitudes of an upper frequency band F 1 which, for example, extends from 1.6 to 3.2 Kc. Converter 27 converts the reception voltages according to the same method into frequencies of a lower frequency band F 2 which, for example, extends from 400 to 800 cps. Thus, the converters 26 and 27 each effect a frequency shift modulation, the shift corresponding to the amplitude of the signal being received at respective given times, only one of the converters 26 and 27 being effective at any one time.

Frequency detector 21, with S-relay 22 connected in, sees to it that converter 26 will go into action for measurement frequencies of up to 1,200 cps and that converter 27 will go into action starting at 1,200 cps. The frequency values thus obtained and corresponding to the reception voltages in the opposite station 3 are retransmitted via line 1 to measurement station 2 and there they are supplied to one of two selective converters 13 and 14, depending upon the position of switching member 10. In case of measurement frequencies up to 1,200 cps, switching member 10 is in the position shown and conducts the incoming voltages to the converter 13 which converts only the frequencies in the range from 1.6 to 3.2 Kc into the corresponding amplitude values. These values are indicated by the level screen 5 whose frequency deflection again is controlled by generator 4. In case of measurement frequencies starting at 1,200 cps, switching member 10 is put into the other position via frequency detector 6 and the R-relay 7 and converter 14 is thus connected with impedance transformer 9. This converter processes only frequencies in the range between 400 and 800 cps and converts them into the corresponding amplitude values which are indicated by the level screen 5. Because the measurement values are transmitted in the form of associated frequencies, the attenuation B–A has no influence on the measurement result. The generator voltage of generator 4 is kept away from the indication when termination 8 is not present or when it is incomplete, by means of converters 13 and 14 which, in each case, work in a frequency range that does not include the momentary generator frequency. As for the rest, the remarks made in connection with the description of FIG. 1 apply here.

FIG. 3 shows an example for digital transmission of measurement values. Here, again, the attenuation in the direction B–A is of no concern to the transmission of the measurement values from the opposite station 3 to the measurement station 2 so that the sequence of measurements A–B and B–A can be selected as desired. For the measurement of line 1 in direction A–B, generator 4 is connected to the line end A via termination 8. The voltages received in opposite station 3 are supplied through the termination 19 and the impedance transformer 20 to an analog-digital transformer 31. Transformer 31 transforms the voltages into pluses that are associated with their particular amplitude, in other words, for example, it produces a pulse telegram, consisting of mark and space signals and corresponding to the particular amplitude of the reception voltage. The pulses are modulated in a modulator 30 either with the frequency $f_1$ which is derived from oscillator 28 and which is, for example, 1,600 cps or with a frequency $f_2$ which is derived from a second oscillator 29 and which amounts, for example, to 800 cps. The voltages are thus retransmitted to the measurement station 2 via termination 19.

By means of switching member 23, which is controlled via the S-relay 22 from frequency detector 21, it can be established that in case of measurement frequencies up to boundary frequency $f$ amounting to, for example, 1,200 cps, the oscillator 28 will be used for modulation while, starting at 1,200 cps, the oscillator 29 will be used for modulation. The pulse structure is furthermore so selected that the frequency spectrum of the pulses modulated with $f_1$ (1,600 cps) will not contain any frequencies below the boundary frequency $f$ and that the spectrum of the pulses modulated with $f_2$ (800 cps) will not contain any frequency above the boundary frequency $f$ of 1,200 cps.

In measurement station 2, the modulated pulses are reconverted in a demodulator 17 into their original form after running through the impedance transformer 9, whereby the switching member 10, which is controlled by frequency detector 6 and R-relay 7, sees to it that demodulation is accomplished with the particular correct frequency. Switching member 10 for this purpose, at measurement frequencies of up to 1,200 cps, connects an oscillator 15, with frequency $f_1$ amounting to 1,600 cps and starting at 1,200 cps it connects an oscillator 16 with frequency $f_2$ amounting to 800 cps with the demodulator 17. The pulses which are obtained afterward and which are similar to the pulses delivered by the analog-digital transformer 31 in opposite station 3, are converted once again into amplitude values in a digital-analog transformer 18 and are indicated by the level screen 5 or they are evaluated according to other known methods.

In the last-described digital method, the retransmission of the measurement values can be accomplished with a desired accuracy, if the pulse structure is selected accordingly and if the run-through speed of generator 4 is adapted to the time requirement for the retransmission which is greater for higher precision. If the measurement values in measurement station 3 are not to be indicated on an analog indicating instrument, but if they are instead to be stored, evaluated, or to be given out in a digital fashion, then digital-analog transformer 18 can be deleted.

The implementation of the methods described is not tied to the presence of terminating sets or hybrid terminations 8 and 19 in measurement station 2 and opposite station 3. The frequency-dependent members 11 and 12 in FIG. 1 take care of the separation of the transmission and reception frequencies in measurement station 2. They can also be arranged as switchable separating filters at the place occupied by termination 8 in FIG. 1, whereby the switching is accomplished, as in the past, by means of switching member 10. It is even more reliable to provide a separating filter (diplexer) at the line end A, in addition to filters 11 and 12.

In FIG. 2, if there is no termination 8, there is likewise no change in the manner in which measurement station 2 works, as described, because the converters 13 and 14 take care of the separation of the reception from the transmission voltages. Here again, a switchable separating filter can be arranged in place of termination 8.

In FIG. 3, the demodulator frequencies $f_1$ and $f_2$, which in each case differ from the transmission frequencies, bring about the separation of the transmission and reception frequencies so that we do not need a termination 8. Of course, here again a switchable separating filter (diplexer) at line end A can be provided.

The switching of the separating filter can be accomplished in each case by means of switching member 10 or by means of an additional switching member which is activated synchronously with it.

If opposite station 3 does not contain a termination 19, then frequency-dependent members are required in all three cases for the separation of the received voltages from the voltages that are to be retransmitted. The simplest thing is to connect a switchable separating filter (diplexer) to the line end B in each case. The switching here can be accomplished by means of switching member 23 or an additional switching member which is activated synchronously with it.

The above-mentioned frequency-dependent members will be provided also, in addition to the terminating set 19, in opposite station 3, if the transition attenuation of the terminating set in the opposite station 3 has a lower value than usual, because of special conditions. Normally, the assumption can be made that, in opposite station 3, the input resistance of the measurement circuit can be adapted by means of the impedance transformer 20 to the termination 19 in such a manner that a high transition atteuation can be achieved. Where this does not apply, the termination errors can easily be compensated by means of the above-mentioned devices, for example, separating filters or the like.

What is claimed is:

1. In a method of measuring frequency-dependent attenuation of a telecommunications line, especially a two-wire line in both traffic directions, from one line end, in which method, frequency-dependent attentuation of the line in the direction from the opposite station to the measurement station is determined in a conventional manner at the measurement station at one line end through the corresponding switch-on of remote-controlled devices in the opposite station at the other end, the improvement comprising the steps of determining the frequency-dependent attenuation of a line in the direction from the measurement station to the opposite station (A–B) by transmitting measurement voltages having different respective frequencies from the measurement station to the opposite station, only one frequency being transmitted at any given time; converting the measurement voltages in the opposite station into further voltages; modulating with these further voltages at least one signal to vary a signal characteristic thereof, said at least one signal in each case always having a different frequency than the frequency of the measurement voltage currently transmitted from the measurement station (A), said signal characteristic variation corresponding to the amplitude of the particular measurement voltage received at the opposite station, transmitting the at least one signal modulated by the further voltages via the line to be measured to the measurement station; and deriving from the at least one signal modulated by the further voltages as, received at the measurement station, signals corresponding to the amplitude of the measurement voltages as received at the opposite station, whereby the frequency transmissions characteristic of the line in both directions is determined for a wide band.

2. A method according to claim 1, including subdividing the frequency band of the measurement voltages into at least two ranges and transmitting the at least one signal from the opposite station to the measurement station with one or more frequencies in one of said ranges during the transmission of measurement voltages in another of said ranges.

3. A method according to claim 2, including converting the measurement voltages, which are received in the opposite station at all frequencies of one range, with retention of their amplitudes into voltages of a frequency from the other range to facilitate transmission of data, corresponding to levels of the measurement voltages as received at the opposite station, from the opposite station to the measurement station.

4. A method according to claim 2, including converting the measurement voltages, which are received in the opposite station at all frequencies in one of said ranges, into frequencies in another of said ranges which correspond to the amplitudes of the measurement voltages as received at the opposite station to facilitate the transmission of data, corresponding to levels of the measurement voltages as received at the opposite station, from the opposite station to the measurement station.

5. A method according to claim 2, including converting the measurement voltages, which are received in the opposite station at all frequencies in one one of said ranges, into pulses corresponding to the amplitudes of the measurement voltages as received at the opposite station to facilitate the transmission from the opposite station to the measurement station, data corresponding to the amplitude of the measurement voltages as received at the opposite station, and modulating the pulses with one or more frequencies of another of said ranges, whereby the modulating spectrum in each case is limited to a range not having as a part the frequency being transmitted at any given time from the measuring station.

6. A method according to claim 1, wherein the signal characteristic is an amplitude characteristic.

7. A method according to claim 1, wherein the signal characteristic is a frequency shift characteristic.

8. A method according to claim 1, wherein the signal characteristic is a phase characteristic.

9. A method according to claim 1, wherein the signal characteristic is a frequency modulation characteristic.

10. In a system for measuring frequency-dependent attenuation of a telecommunications line, especially a two-wire line in both traffic directions, from one line end, in which system, frequency-dependent attenuation of the line in the direction from the opposite station to the measurement station is conventionally determined from the measurement station at one line end through the corresponding switch-on of remote-controlled devices in the opposite station at the other line end, the improvement comprising:

a. means for determining the frequency-dependent attenuation of a line in the direction from the measurement station to the opposite station (A--B), said means for determining including means for transmitting measurement voltages having different respective frequencies from the measurement station to the opposite station, only one frequency being transmitted at any given time;

b. means for converting the measurement voltages in the opposite station into further voltages;

c. means for modulating with these further voltages at least one signal to vary a signal characteristic thereof, said at least one signal in each case having a different frequency than the frequency currently transmitted from the measurement station and said signal characteristic variation corresponding to the amplitude of the particular measurement voltages received at the opposite station;

d. means for transmitting the at least one signal modulated by the further voltages via the line to be measured to the measurement station; and e. means at said measurement station for deriving, from the at least one signal modulated by the further voltages as received at the measurement station, signals corresponding to the amplitude of the measurement voltages as received at the opposite station.

11. A system according to claim 10, wherein said means for modulating the signal characteristic is an amplitude modulating means.

12. A system according to claim 10, wherein said means for modulating the signal characteristic is a frequency shift modulating means.

13. A system according to claim 10, wherein said means for modulating the signal characteristic is a phase modulating means.

14. A system according to claim 10, wherein said means for modulating the signal characteristic is a frequency modulating means.

* * * * *